United States Patent [19]

Sano et al.

[11] Patent Number: 4,482,103
[45] Date of Patent: Nov. 13, 1984

[54] WEBBING-LOCKING MECHANISM

[75] Inventors: Yasumasa Sano; Osamu Kawai, both of Fujisawa, Japan

[73] Assignee: NSK-Warner K.K., Japan

[21] Appl. No.: 445,455

[22] Filed: Nov. 30, 1982

[30] Foreign Application Priority Data

Dec. 11, 1981 [JP] Japan .................. 56-184405[U]

[51] Int. Cl.³ .................. A62B 35/02; B65H 75/48
[52] U.S. Cl. .................. 242/107.2; 188/65.1
[58] Field of Search .................. 242/107.2, 107.4 A; 280/806–808; 297/478, 479, 480; 188/65.1

[56] References Cited

U.S. PATENT DOCUMENTS 4,383,659 5/1983 Okabe .................. 242/107.2

Primary Examiner—John M. Jillions
Attorney, Agent, or Firm—McGlew and Tuttle

[57] ABSTRACT

The specification describes a webbing-locking mechanism suitable for use in a vehicle. The webbing-locking mechanism includes a guide roller allowing a webbing, which is fastened at one end thereof to a take-up reel, to extend over a predetermined length of the circumference of the guide roller. It further comprises a locking member capable of assuming either first position to permit free rotation of the guide roller or second position to inhibit any rotation of the guide roller; and guide means adapted to guide the locking member from the first position to the second position when a tensile force of a predetermined value or greater has been applied to the webbing and from the second position to the first position when the tensile force has been released. Since the movement of the locking member is controlled by the guide means, the structure of the above webbing-locking mechanism has been simplified around the locking member. This permits easier assembly work of webbing-locking mechanisms.

12 Claims, 8 Drawing Figures

WEBBING-LOCKING MECHANISM

BACKGROUND OF THE INVENTION

1. Field of the Invention

This invention relates to a webbing-locking mechanism suitable for use in a vehicle seat belt.

2. Description of the Prior Art

In order to protect a vehicle occupant from a secondary collision against interior structural members or parts of the vehicle or a similar hazard in case of emergency such as collision or the like accident, it has become necessary to minimize the length of a webbing which may be paid out from its retractor upon such an emergency.

The above consideration is particularly important for an automatic seat belt which restrains a vehicle occupant automatically when he has sat on the seat and closed the door, because more webbing is taken up in the retractor and the webbing may be paid out over a considerable length due to the tightening of the webbing wound on a take-up reel in case of emergency, thereby failing to effectively protect the vehicle occupant. With a view toward solving such a problem, a variety of locking devices or mechanisms have been proposed to lock each webbing between its corresponding retractor and a point where the webbing is first brought into contact with the vehicle occupant. Many of such locking devices or mechanisms are of such a type that a guide roller is provided to allow a webbing to extend over a predetermined length of its circumference and the webbing is held between the guide roller and its matching clamp member. It has also been known that, in a webbing-locking device or mechanism of such a type as mentioned above, the webbing may be locked more effectively by stopping rotation of the guide roller so as to make use of a friction resistance to be developed between the thus-stopped guide roller and the webbing.

As one way of stopping the rotation of a guide roller, it has conventionally been known to use such a mechanism as shown in FIG. 1. Namely, when the tensile force applied to a webbing W wrapped over a guide roller 1 exceeds a predetermined value, the guide roller 1 turns clockwise together with a lever 2 about a pin 3 and the webbing W is thus held between the guide roller 1 and a clamp plate 4. Here, a locking member 5, which serves to stop the rotation of the guide roller 1, moves together with the lever 2, thereby bringing a guide member 6 provided integrally with the locking member 5 into contact with a guide pin 7 and thus turning the locking member 5 counterclockwise. The locking member 5 is therefore brought into engagement with the guide roller 1 so as to stop the rotation of the guide roller 1. Owing to the spring force of a return spring 8 provided with the locking member 5, the locking member 5 and guide roller 1 are disengaged from each other when the tensile force has been released.

In the above-referred to locking mechanism, it is indispensable to incorporate the return spring 8 for allowing the locking member 5 to assume its normal position. This renders the structure unavoidably complex in the vicinity of the locking member 5, thereby raising such problems that parts or members interfere with one another and their assembly work takes lots of time.

SUMMARY OF THE INVENTION

With the foregoing problems in view, it is an object of this invention to provide a webbing-locking mechanism which is simple in structure and is capable of controlling rotation of the guide roller without failure.

The present inventors have found that the above object can be achieved by making use of tensile forces exerted to each webbing so as to control the activation or deactivation of a locking member, which is operably engaged with or disengaged from the guide roller, by means of a guide member.

In one aspect of this invention, there is thus provided a webbing-locking mechanism including a guide roller allowing a webbing, which is fastened at one end thereof to a take-up reel, to extend over a predetermined length of the circumference of the guide roller, which mechanism comprises a locking member capable of assuming either a first position to permit free rotation of the guide roller or a second position to inhibit any rotation of the guide roller; and guide means adapted to guide the locking member from the first position to the second position when a tensile force of a predetermined value or greater has been applied to the webbing and from the second position to the first position when the tensile force has been released. The guide means may be displaceable together with the guide roller.

In another aspect of this invention, there is also provided a webbing-locking mechanism which comprises a base; a lever swingably supported by the base; a guide roller rotatably supported by the lever and allowing a webbing, which is fastened at one end thereof to a take-up reel, to extend over a predetermined length of the circumference of the guide roller; a locking member supported by the lever in such a way that it can assume either a first position to permit free rotation of the guide roller or a second position to inhibit any rotation of the guide roller; and guide means adapted to guide the locking member from the first position to the second position when a tensile force of a predetermined value or greater has been applied to the webbing and from the second position to the first position when the tensile force has been released.

Since the webbing-locking mechanism according to this invention controls, by means of the guide means, the movement of the locking member which assumes either the first position to permit free rotation of the guide roller or the second position to inhibit any rotation of the guide roller, its structure has been simplified around the locking-member and this invention has therefore brought about an effect that the assembly work of webbing-locking mechanisms has become easier.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 2:
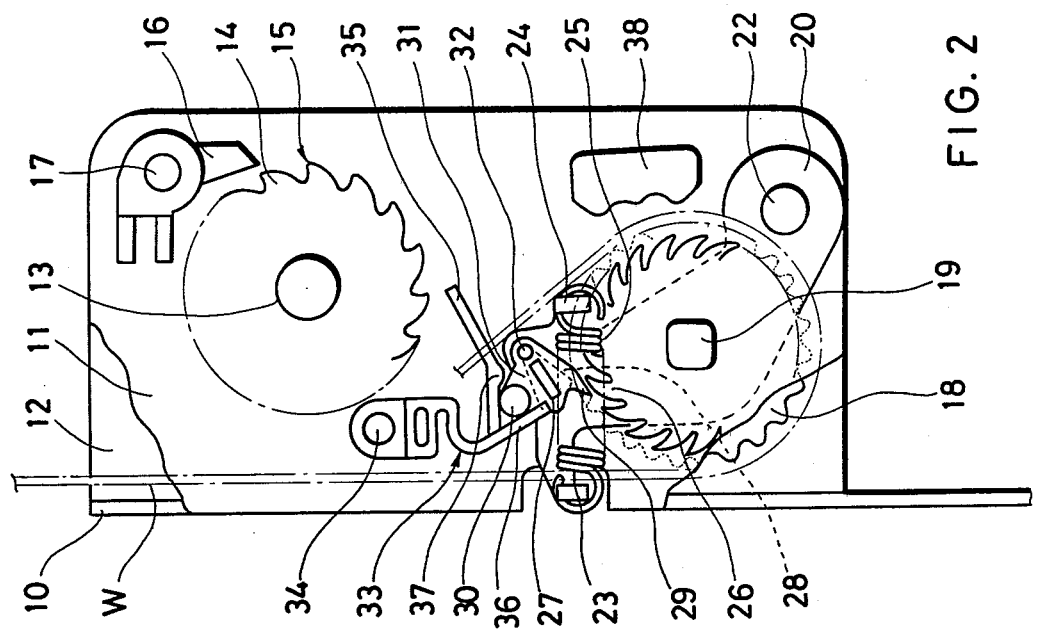
FIG. 2 is a simplified side view of the webbing-locking mechanism according to the first embodiment of this invention, in which both take-up reel and guide roller are unlocked.

Referring first to FIGS. 2 to 5 which illustrate the operation of the webbing-locking mechanism according to the first embodiment of this invention, a reel shaft 13 is provided between both side plates 11,12 at an upper part of a base 10. A ratchet gear 14 is provided integrally with the reel shaft 13 so as to make up a take-up reel 15. One end of a webbing W is fastened on the take-up reel 15 by a method commonly known in the art. The webbing W is wound in layers over the reel shaft 13. Outside the side plate 12, a take-up spring (not illustrated) is provided so as to bias the take-up reel 15 normally in the webbing-winding direction (namely, in the clockwise direction in FIG. 2).

Figure 1:
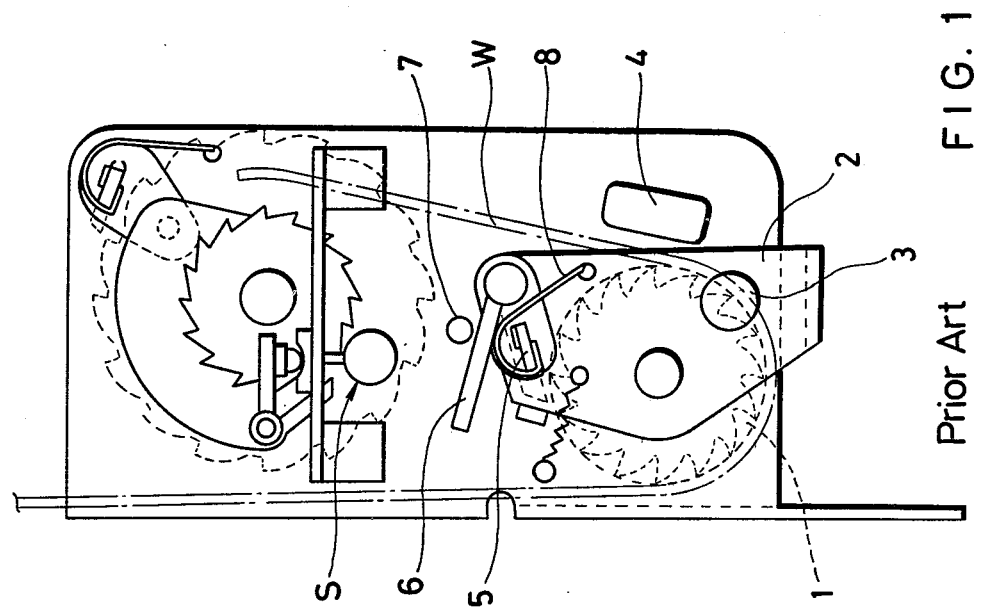
FIG. 1 is a schematic illustration of a conventional webbing-locking mechanism.

At the upper right of the take-up reel 15, a pawl 16 is rotatably supported on a pin 17. In the event of emergency, the pawl is activated by an unillustrated inertia sensor (for example, a pendulum indicated by the letter S in FIG. 1) and brought into engagement with the ratchet gear 14.

On the other hand, at a lower part of the base 10, a guide roller 18 is rotatably supported on a roller shaft 19 to allow the webbing W to extend over a predetermined length of the circumference of the guide roller 18. The circumference of the guide roller 18 is formed in a wavy pattern to ensure the clamping of the webbing W between the guide roller 18 and its matching clamp plate 38 which will be described later in this specification. The roller shaft 19 is supported by levers 20, (the drawing shows only the lever 20 which is closer to viewers) which are respectively provided outside their corresponding side plates 11,12 of the base 10. The levers 20, are swingable about a lever shaft 22. Through the side plates 11,12, are formed release slots for the roller shaft 19. The guide roller 18 is normally held in a position shown in FIG. 2 by virtue of the biasing force of a coil spring 25 which is hooked at one end thereof on a lug 23 of the base 10 and at the other end thereof on another lug 24 formed on the lever 20. In addition, a ratchet gear 26 is provided at the side of the side plate 11 and outside the lever 20 (namely, closer to viewers than the lever 20 in the drawing) in such a way that the ratchet gear 26 rotates as an integral part with the guide roller 18.

Above the guide roller 18, a locking member 27 which may be brought into engagement with or released from the engagement with the wave-patterned circumference of the guide roller 18 extends through the release slots formed respectively through the side plates 11,12 and is freely inserted into sector-shaped openings 28 formed respectively through the Levers 20. The locking member 27 is provided integrally with a guide plate 31 which defines a pawl 29 and pin 30. When the guide plate 31 turns about a pin 32 provided on the lever 20, the locking member 27 is either engaged with or disengaged from the guide roller 18.

Furthermore, a guide wall 33 is attached by a rivet 34 on the side plate 11 of the base 10 so as to hold the pin 30 formed on the guide plate 31 in contact with the guide wall 33, thereby controlling the movement of the guide plate 31 and hence controlling the movement of the locking member 27. The guide wall 33 is bifurcated into a longer wall portion 35 and shorter wall portion 36. The longer wall portion 35 is upwardly bent at its central bumpy part 37.

At the right of the guide roller 18, the clamp plate 38 is fixedly provided between the side plates 11 and 12 of the base 10.

The operation of the webbing-locking mechanism of the above structure will now be described. The webbing W is paid out from the take-up reel 15, wrapped over the guide reel 18 and reversed there, and then guided upwardly normally in the state illustrated in FIG. 2. In this state, the guide roller 18 is biased in the counter-clockwise direction by the coil spring 25 which acts on the lever 20, thereby maintaining a clearance sufficient to permit the free passage of the webbing W between the guide roller 18 and clamp plate 38. Since the locking member 27 is in the first position where it permits free rotation of the guide roller 18, the webbing W can be freely paid out or taken up.

Figure 3:
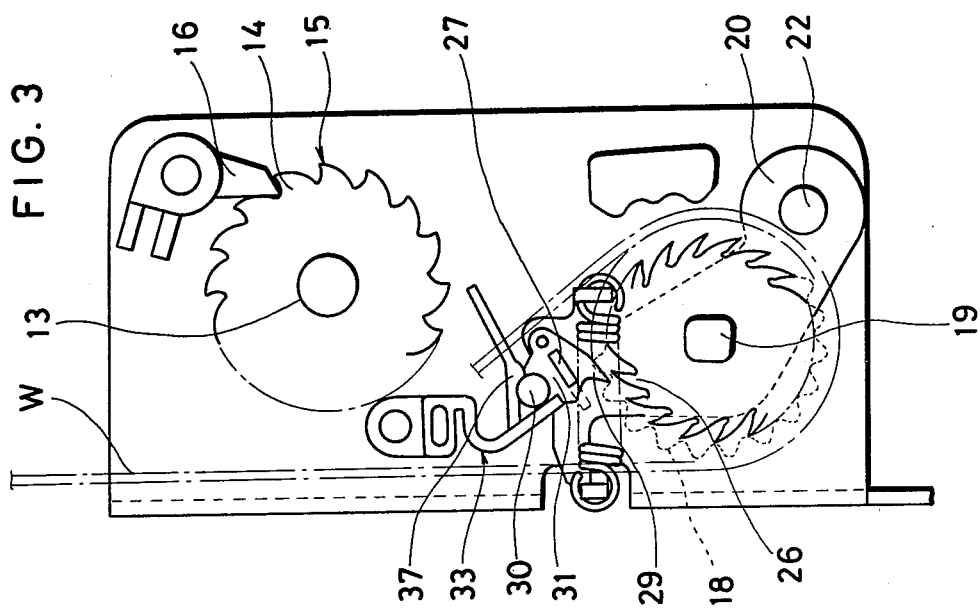
FIG. 3 is a simplified side view of the webbing locking mechanism of FIG. 2, in which the take-up reel has been locked but the guide roller has not yet been locked.

In the event of an emergency, the unillustrated inertia sensor detects a sudden change of the vehicle speed and the pawl 16 is brought into engagement with the ratchet gear 14 so as to stop the rotation of the take-up reel 15. However, the webbing W is still pulled out because the occupant tends to move frontwards owing to an inertia force applied to the occupant. When a tensile force of a predetermined value or greater has been applied to the webbing W, the guide roller 18 supported on the levers 20, overcomes the biasing force of the coil spring 25 and starts to turn clockwise about the lever shaft 22. This state is shown in FIG. 3. As apparent from FIG. 3, the locking member 27 moves together with the guide plate 31 supported on the lever 20 along the longer wall portion 35 of the guide wall 33 owing to the provision of the pin 30 on the guide plate 31. However, the pawl 29 of the guide plate 31 has not yet engaged with the ratchet gear 26.

When the guide roller 18 is turned further in the clockwise direction owing to the tensile force applied to the webbing W, the guide plate 31 is forceably turned counter-clockwise by the bumpy part 37 provided on the longer wall portion 35 of the guide wall 33, thereby displacing the pawl 29 to a position where the pawl 29 is engageable with the ratchet gear 26. At this stage, the guide roller 18 is caused to slightly turn clockwise about the roller shaft 19 owing to the tightening or the like of the webbing W wound over the reel shaft 13. Therefore, the guide plate 31 falls into still deeper engagement with the ratchet gear 26, namely, it assumes the position illustrated in FIG. 4.

Figure 4:
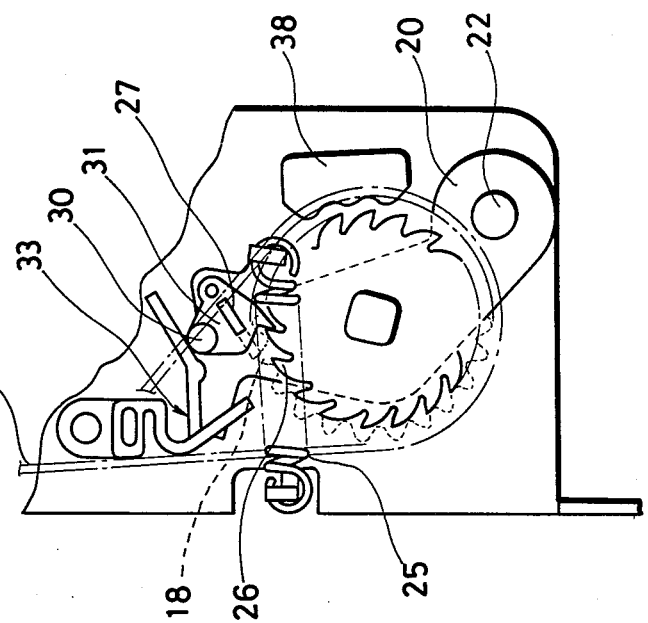
FIG. 4 is a simplified fragmentary side view of the webbing-locking mechanism of FIG. 2, in which the guide roller has been locked and the webbing has been held between the guide roller and a clamp plate.

As readily envisaged from FIG. 4, concurrently with the establishment of a deep engagement between the guide plate 31 and ratchet gear 26, the locking member 27 is interlocked with the wave-patterned circumference of the guide roller 18. In other words it is shifted to the second position. This completely inhibits any rotation of the guide roller 18, thereby holding the webbing W firmly between the guide roller 18 and clamp plate 38.

When the tensile force is released from the webbing W, the guide roller 18 is caused to swing counter-clockwise about the lever shaft 22 owing to the biasing force of the coil spring 25. At the same time, the guide plate 31 supported on the lever 20 is caused to move along the guide wall 33 owing to the provision of the pin 30.

Figure 5:
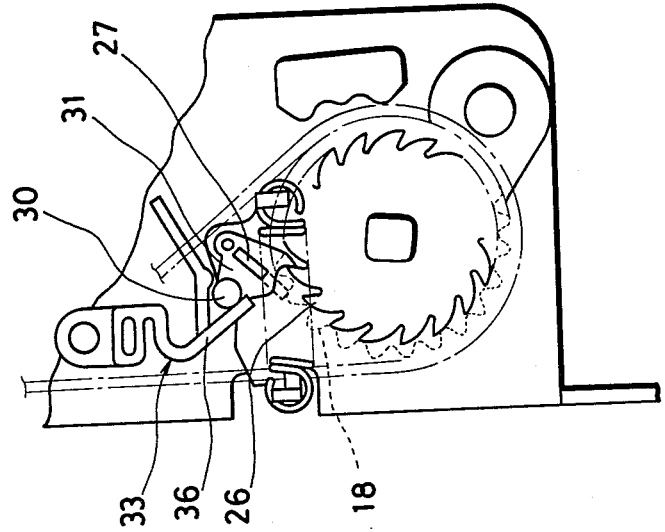
FIG. 5 is a simplified fragmentary side view of the webbing-locking mechanism of FIG. 2, in which the guide roller is on its way of returning to its normal position.

In FIG. 5, the guide roller 18 is on its way to returning to its normal position. At this stage, the locking member 27 is still in engagement with the wave-patterned circumference of the guide roller 18. However, when the guide roller 18 is further swung counterclockwise by the biasing force of the coil spring 25 from its position shown in FIG. 5, the pin 30 of the guide plate 31 is brought into contact with the shorter wall portion 36 of the guide wall 33 and the guide plate 31 is caused to turn clockwise about the pin 32. Accordingly, the locking member 27 is released from engagement with the ratchet gear 26, thereby forceably turning the guide plate 31 in the clockwise direction and allowing it to assume its normal position shown in FIG. 2.

Since the engagement or disengagement of the locking member 27 with or from the guide roller 18 is controlled by the guide wall 33 as described above, the above webbing-locking mechanism does not require any complex structure such as that including a return spring provided with the locking member.

Figure 6:
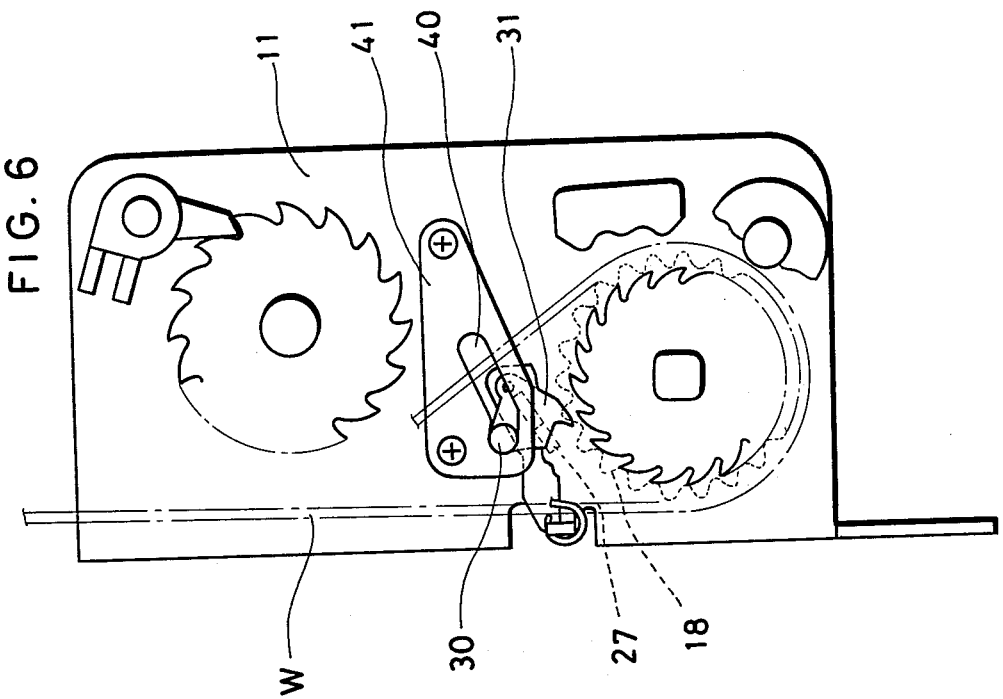
FIG. 6 is a simplified side view of the webbing-locking mechanism according to the second embodiment of this invention.

Next, the second embodiment of this invention will be described with reference to FIG. 6, in which the guide member is different in configuration from the guide member of the first embodiment. In the second embodiment, a guide plate 41 defining a guide slot 40 is fixedly provided on the side plate 11, in place of the guide wall 33 in the first embodiment. In the second embodiment, the guide plate 31 is also displaced in association with the swinging movement of the guide roller 18 which swinging movement takes place in accordance with tensile forces exerted to the webbing W. Since the pin 30 provided on the guide plate 31 is guided along the guide slot 40, the locking member 27 is forceably displaced between the first position where the locking member 27 is brought into engagement with the guide roller 18 and the second position where the locking member 27 is disengaged from the guide roller 18.

Figure 7:
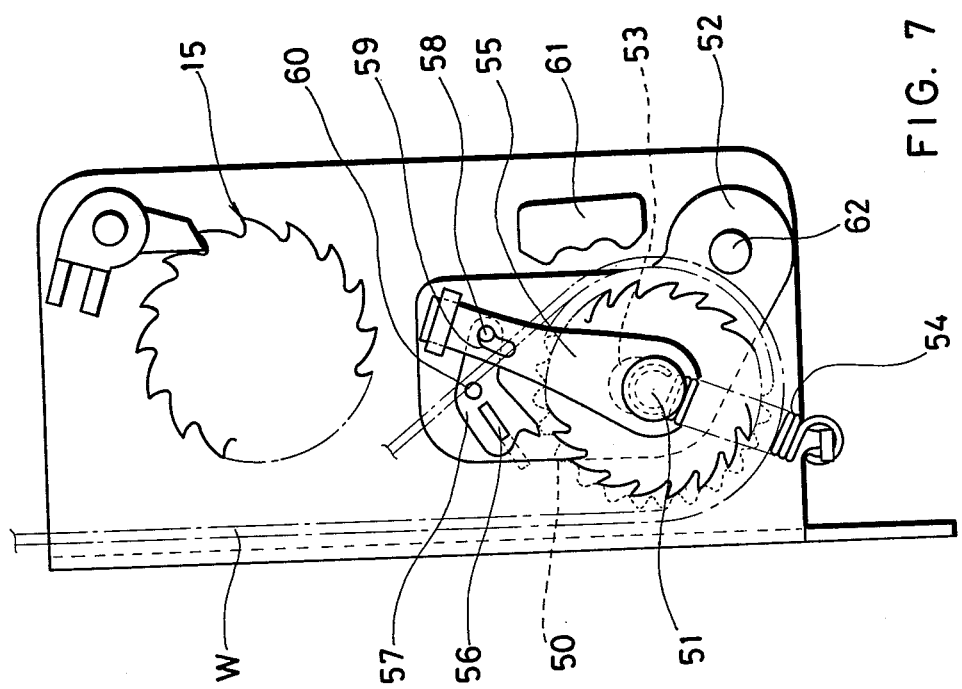
FIG. 7 is a simplified side view of the webbing-locking mechanism according to the third embodiment of this invention.

The third embodiment will now be described with reference to FIG. 7, in which the guide member is provided on the roller shaft. In this embodiment, a roller shaft 51 rotatably supporting a guide roller 50 is loosely fit in an elongated hole 53 formed through a lever 52 and normally biased downwardly by means of a coil spring 54 which is hooked at one end thereof on the roller shaft 51. A guide plate 55, which serves as a guide member, is provided on the roller shaft 51 and is displaceable relative to the lever 52.

On the other hand, a guide plate 57 is provided integrally on a locking member 56 which is arranged above the guide roller 50. A pin 58 provided on the guide plate 57 is kept in engagement with a guide slot 59 formed through the guide plate 55.

When the rotation of the take-up reel 15 has been stopped and the tensile force applied to the webbing W has reached or exceeded a predetermined value in the event of emergency, the guide roller 50, and, the roller shaft 51 are displaced upwardly along the elongated hole 53. Simultaneously with the upward displacement of the roller shaft 51, the guide plate 55 is displaced upwardly relative to the lever 52. Accordingly, the guide plate 57, which is in engagement with the guide slot 59 of the guide plate 55, is forceably caused to turn counter-clockwise about a pin 60, thereby bringing the locking member 57 into engagement with the wave-patterned circumference of the guide roller 50 in the same way as in the first embodiment. Owing to the tensile force exerted to the webbing W, the guide roller 50 and lever 52 are swung as integral parts in the clockwise direction about a lever shaft 62 so as to firmly hold the webbing W between the guide roller 50 and clamp plate 61. When the tensile force is released from the webbing W, the guide plate 55 is allowed to move together with the roller shaft 51 downwardly by the biasing force of the coil spring 54. Thus, the guide plate 57 is turned clockwise along the guide slot 59 so that the locking member 56 assumes a position where the locking member 56 is not in engagement with the guide roller 50.

Figure 8:
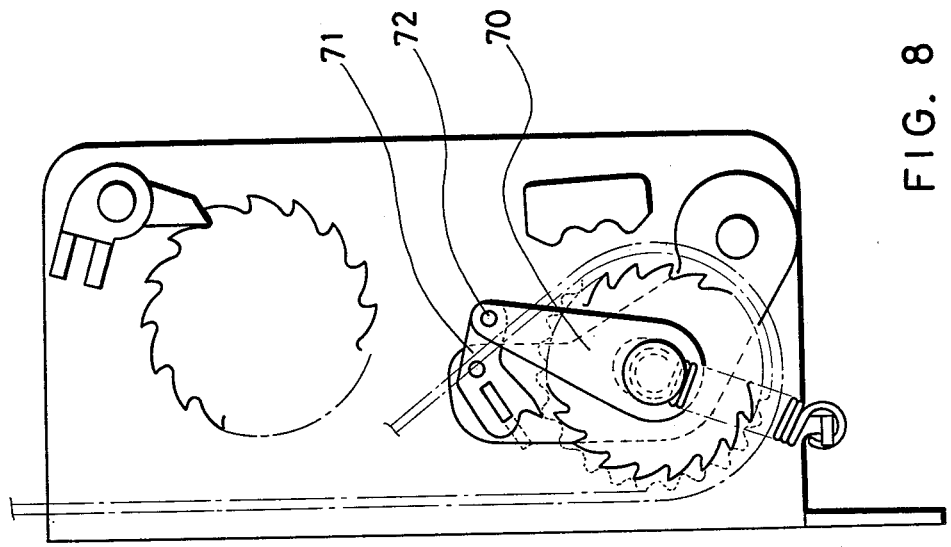
FIG. 8 is a simplified side view of the webbing-locking mechanism according to the fourth embodiment of this invention.

Next, the fourth embodiment of this invention, which is a variation of the third embodiment, will be described with reference to FIG. 8. The fourth embodiment is different from the third embodiment in that one end of a guide plate 70 and a guide plate 71 are interconnected by a pin 72. The operation of the fourth embodiment is substantially identical to that of the third embodiment and is thus omitted.

In each of the above embodiments, the retractor adapted to take up the webbing and the webbing-locking mechanism for allowing the webbing to extend over a predetermined length of the circumference of its guide roller and locking the webbing firmly between the guide roller and the clamp plate in the event of emergency are assembled as integral parts in the base. They may of course be assembled in separate bases if desired, for example, in view of their installation space.

Furthermore, a retractor, namely, a take-up reel is used in each of the above embodiments. The present invention may also be applied to lock a webbing which is not fastened at one end thereof to a take-up reel. Reference may be made to U.S. Pat. No. 3,535,001 issued Oct. 20, 1979 to Gerald F. Lewis and Ronald J. Palmieri and U.S. Pat. No. 3,557,914 issued Jan. 26, 1971 to Akira Tanaka.

Having now fully described the invention, it will be apparent to one of ordinary skill in the art that many changes and modifications can be made thereto without departing from the spirit or scope of the invention as set forth herein.

What is claimed is:

1. A webbing-locking mechanism including a rotatable guide roller allowing a webbing, which is fastened at one end thereof to a take-up reel, to extend over a predetermined length of the circumference of the guide roller, said mechanism comprising:
    a locking member and means for mounting the locking member for movement between a first position to permit free rotation of the guide roller and a second position to inhibit any rotation of the guide roller; and
    guide means for guiding the locking member from the first position to the second position when a tensile force of a predetermined value or greater has been applied to the webbing and from the second position to the first position when the tensile force has been released, means for mounting the guide roller for displacement relative to the guide means, said locking member being displaceable by the guide means when the guide roller is displaced relative to the guide means, wherein the said guide means is provided with a first guide portion to guide the locking member from the first position to the second position when the guide roller has been displaced by the tensile force applied to the webbing and a second portion to guide the locking member from the second position to the first position when the tensile force has been released.

2. A mechanism as claimed in claim 1, further comprising a guide plate provided integrally with the locking member, which guide plate is guided along the guide means.

3. A mechanism as claimed in claim 2, further comprising a ratchet gear integrally provided with the guide roller, an interlocking portion, which is engageable with the ratchet gear, provided with the guide plate in such a way that the interlocking portion of the guide plate is first brought into engagement with the ratchet gear and the locking member is then displaced to the second position.

4. A mechanism as claimed in claim 1, wherein the guide means is formed into a guide wall.

5. A mechanism as claimed in claim 1, wherein the guide means is formed into a guide slot.

6. A mechanism comprising a guide roller allowing a webbing, which is adapted to be fastened at one end thereof to a take-up reel, to extend over a predetermined length of the circumference of said guide roller,
a locking member movable together with said guide roller and means for mounting the locking member for movement between a first position to permit free rotation of said guide roller and a second position to inhibit any rotation of said guide roller; and
guide means for guiding said locking member between said positions and comprising a guide member which is equipped with a first guide portion for guiding said locking member from the first position to the second position when a tensile force of at least a predetermined value has been applied to the webbing, said guide roller being first displaced relative to said guide member and said locking member then being displaced by said guide member, and a second guide portion for guiding said locking member from the second position to the first position when the tensile force has been released, said guide roller being first displaced and said locking member then being displaced by said guide member.

7. A mechanism as claimed in claim 6, wherein said guide member is a single-piece guide member.

8. A mechanism as defined in claim 6 wherein said guide roller is provided with a wavy circumferential pattern.

9. A mechanism comprising:
a base;
a lever swingably supported on the base;
a guide roller rotatably supported by said lever and allowing a webbing, which is fastened at one end thereof to a take-up reel, to extend over a predetermined length of the circumference of said guide roller;
a locking member supported on the lever for movement between a first position to permit free rotation of said guide roller and a second position to inhibit any rotation of said guide roller; and
guide means for guiding said locking member between said positions and comprising a guide member provided on the base, said guide member being equipped with a first guide portion for guiding said locking member from the first position to the second position when a tensile force of at least a predetermined value has been applied to the webbing, said guide roller being first displaced relative to said guide member and said locking member then being displaced by said guide member, and a second guide portion for guiding said locking member from the second position to the first position when the tensile force has been released, said guide roller being first displaced and said locking member then being displaced by said guide member.

10. A mechanism as claimed in claim 9, wherein the lever and guide members are displaceable relative to each other.

11. A mechanism including a guide roller allowing a webbing, which is fastened at one end thereof to a take-up reel, to extend over a predetermined length of the circumference of the guide roller, said mechanism comprising:
a base; roller
means for mounting the guide roll for displacement relative to the base;
a locking member and means for mounting the locking member on said guide roller mounting means for movement between a first position to permit free rotation of the guide roller and a second position to inhibit any rotation of the guide roller;
a roller shaft for rotatably supporting the guide roller on said guide roller mounting means;
said guide roller mounting means including means for allowing relative displacement; and
guide means for guiding the locking member between said positions, said guide means comprising a guide member provided on the roller shaft and displaceable together with the guide roller relative to the locking member so as to guide the locking member from the first position to the second position when a tensile force of at least a predetermined value has been applied to the webbing and for guiding the locking member from the second position to the first position when the tensile force has been released.

12. A webbing-locking mechanism as claimed in claim 11, wherein the guide member and locking member are interconnected.

* * * * *